US010255417B2

(12) United States Patent
Alameh et al.

(10) Patent No.: US 10,255,417 B2
(45) Date of Patent: *Apr. 9, 2019

(54) ELECTRONIC DEVICE WITH METHOD FOR CONTROLLING ACCESS TO SAME

(71) Applicant: Google Technology Holdings LLC, Mountain View, CA (US)

(72) Inventors: Rachid M Alameh, Crystal Lake, IL (US); Jiri Slaby, Buffalo Grove, IL (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/618,427

(22) Filed: Jun. 9, 2017

(65) Prior Publication Data

US 2017/0277876 A1    Sep. 28, 2017

Related U.S. Application Data

(63) Continuation of application No. 14/276,107, filed on May 13, 2014, now Pat. No. 9,710,629.

(51) Int. Cl.
*G06F 21/32* (2013.01)
*G06T 7/20* (2017.01)
(Continued)

(52) U.S. Cl.
CPC ............ *G06F 21/32* (2013.01); *G06F 21/62* (2013.01); *G06T 7/20* (2013.01); *H04L 63/08* (2013.01);
(Continued)

(58) Field of Classification Search
CPC ........ G06F 21/32; G06F 21/316; G06F 21/31; G06F 21/62; G06T 7/20; H04L 63/08; H04L 63/0861
See application file for complete search history.

(56) References Cited

U.S. PATENT DOCUMENTS 6,278,884 B1    8/2001    Kim
6,707,487 B1    3/2004    Aman et al.
(Continued)

FOREIGN PATENT DOCUMENTS

CN    102662554 A    9/2012
CN    103761463 A    4/2014
(Continued)

OTHER PUBLICATIONS

European Patent Office; International Search Report and Written Opinion; PCT Application No. PCT/US2015/030527; dated Sep. 2, 2015.

(Continued)

*Primary Examiner* — Joseph P Hirl
*Assistant Examiner* — Stephen T Gundry
(74) *Attorney, Agent, or Firm* — Faegre Baker Daniels LLP

(57) ABSTRACT

An electronic device is able to alter one or more settings of its imager based on the motion of a user that the device is attempting to authenticate. The electronic device, in one implementation, captures a first set of image data of the user (e.g., a video or still photo of the user), detects motion of the user, alters a setting of the imager based on the motion, captures a second set of image data of the user, and authenticates the user based on the second set of image data. In some implementations, the electronic device has multiple imagers, and activates one or more additional imagers based on the detected motion of the user.

7 Claims, 7 Drawing Sheets

(51) Int. Cl.
  *G06F 21/62* (2013.01)
  *H04L 29/06* (2006.01)
  *H04W 12/06* (2009.01)

(52) U.S. Cl.
  CPC ......... *H04L 63/0861* (2013.01); *H04W 12/06* (2013.01); *G06F 2221/2111* (2013.01)

(56) References Cited

U.S. PATENT DOCUMENTS

| | | | | |
|---|---|---|---|---|
| 8,364,971 | B2* | 1/2013 | Bell | G06F 21/32 382/117 |
| 8,594,374 | B1* | 11/2013 | Bozarth | G06F 21/36 382/103 |
| 8,646,060 | B1 | 2/2014 | Ben Ayed | |
| 8,693,726 | B2* | 4/2014 | Karakotsios | G06K 9/00355 348/169 |
| 8,856,541 | B1* | 10/2014 | Chaudhury | G06F 21/32 382/115 |
| 8,886,953 | B1* | 11/2014 | Sipe | G06F 21/32 713/186 |
| 8,966,613 | B2* | 2/2015 | Horvitz | G06F 21/32 726/17 |
| 8,983,201 | B2 | 3/2015 | Ran | |
| 9,066,125 | B2* | 6/2015 | Sands | G06F 21/31 |
| 9,147,061 | B1* | 9/2015 | McClendon | G06F 21/32 |
| 9,158,904 | B1 | 10/2015 | Ross | G06K 9/00214 |
| 9,195,817 | B2* | 11/2015 | Scully-Power | G06F 21/32 |
| 9,202,105 | B1 | 12/2015 | Wang | G06Q 20/4014 |
| 9,213,817 | B2* | 12/2015 | Chatterton | G06F 21/32 |
| 9,280,652 | B1* | 3/2016 | Bozarth | G06F 21/36 |
| 9,323,912 | B2* | 4/2016 | Schultz | G06F 21/32 |
| 9,408,076 | B2* | 8/2016 | Chen | H04W 12/06 |
| 9,424,418 | B2 | 8/2016 | Li et al. | |
| 9,510,196 | B2* | 11/2016 | Sensharma | H04W 12/06 |
| 9,519,769 | B2 | 12/2016 | Azar | |
| 9,552,684 | B2* | 1/2017 | Bacco | G07C 9/00158 |
| 9,576,121 | B2* | 2/2017 | Cao | G06F 21/32 |
| 9,600,304 | B2* | 3/2017 | DiVincent | G06F 21/32 |
| 9,626,493 | B2* | 4/2017 | Cohen | G06F 21/32 |
| 9,690,480 | B2* | 6/2017 | Ferren | G02B 13/0065 |
| 9,710,629 | B2* | 7/2017 | Alameh | G06T 7/20 |
| 9,710,691 | B1* | 7/2017 | Hatcher | G06K 9/00033 |
| 9,721,175 | B2* | 8/2017 | Kursun | G06K 9/00926 |
| 9,747,428 | B2* | 8/2017 | Tartz | G06F 21/83 |
| 9,760,383 | B2* | 9/2017 | DiVincent | G06F 9/4451 |
| 9,760,785 | B2* | 9/2017 | Kursun | G06K 9/00892 |
| 9,778,842 | B2* | 10/2017 | Ferren | G06F 3/04886 |
| 9,785,763 | B2* | 10/2017 | Scully-Power | G06F 21/34 |
| 2002/0107649 | A1 | 8/2002 | Takiguchi | |
| 2002/0109863 | A1 | 8/2002 | Monroe | |
| 2003/0053662 | A1* | 3/2003 | Evoy | G06K 9/00221 382/115 |
| 2005/0232470 | A1 | 10/2005 | Chaudhari et al. | |
| 2006/0058920 | A1 | 3/2006 | Matsunaga et al. | |
| 2006/0081771 | A1 | 4/2006 | Eliad Wardimon | |
| 2007/0005988 | A1 | 1/2007 | Zhang et al. | |
| 2007/0168677 | A1 | 7/2007 | Kudo et al. | |
| 2008/0220809 | A1 | 9/2008 | Hansen | |
| 2008/0225120 | A1 | 9/2008 | Stuecker | |
| 2009/0083847 | A1 | 3/2009 | Fadell | |
| 2009/0088204 | A1 | 4/2009 | Culbert | |
| 2010/0134310 | A1 | 6/2010 | Zheng et al. | |
| 2010/0205667 | A1 | 8/2010 | Anderson et al. | |
| 2010/0299530 | A1* | 11/2010 | Bell | G06F 21/32 713/186 |
| 2011/0037866 | A1 | 2/2011 | Iwamoto | |
| 2012/0038796 | A1 | 2/2012 | Posa et al. | |
| 2012/0046012 | A1 | 2/2012 | Forountanpour et al. | |
| 2012/0287031 | A1 | 11/2012 | Valko et al. | |
| 2012/0287035 | A1 | 11/2012 | Valko et al. | |
| 2012/0315016 | A1 | 12/2012 | Fung | |
| 2013/0004016 | A1* | 1/2013 | Karakotsios | G06K 9/00355 382/103 |
| 2013/0055348 | A1* | 2/2013 | Strauss | G06F 21/31 726/3 |
| 2013/0086674 | A1* | 4/2013 | Horvitz | G06F 21/32 726/19 |
| 2013/0179965 | A1 | 7/2013 | Li et al. | |
| 2013/0208103 | A1 | 8/2013 | Sands | |
| 2013/0227651 | A1 | 8/2013 | Schultz et al. | |
| 2013/0267204 | A1 | 10/2013 | Schultz | |
| 2013/0287031 | A1 | 10/2013 | Ge | |
| 2013/0322705 | A1 | 12/2013 | Wong | |
| 2013/0326613 | A1 | 12/2013 | Kochanski | |
| 2014/0013422 | A1 | 1/2014 | Janus et al. | |
| 2014/0059673 | A1* | 2/2014 | Azar | G06F 21/32 726/19 |
| 2014/0075548 | A1 | 3/2014 | Sampathkumaran et al. | |
| 2014/0089243 | A1 | 3/2014 | Oppenheimer | |
| 2014/0112550 | A1* | 4/2014 | Hanna | G06K 9/00604 382/117 |
| 2014/0118520 | A1* | 5/2014 | Slaby | G06K 9/00926 348/77 |
| 2014/0123275 | A1* | 5/2014 | Azar | H04W 12/06 726/19 |
| 2014/0130127 | A1 | 5/2014 | Toole et al. | |
| 2014/0137191 | A1 | 5/2014 | Goldsmith et al. | |
| 2014/0197922 | A1 | 7/2014 | Stanwood et al. | |
| 2014/0219515 | A1* | 8/2014 | Karakotsios | G06K 9/00355 382/115 |
| 2014/0230047 | A1 | 8/2014 | Scully-Power et al. | |
| 2014/0250523 | A1 | 9/2014 | Savvides et al. | |
| 2014/0282271 | A1 | 9/2014 | Lu et al. | |
| 2014/0289834 | A1 | 9/2014 | Lindemann | |
| 2014/0310801 | A1 | 10/2014 | Juhani | |
| 2014/0330560 | A1 | 11/2014 | Venkatesha | |
| 2014/0333413 | A1* | 11/2014 | Kursun | G06K 9/00892 340/5.52 |
| 2014/0333414 | A1* | 11/2014 | Kursun | G06K 9/00926 340/5.82 |
| 2014/0337949 | A1 | 11/2014 | Hoyos | |
| 2014/0362231 | A1 | 12/2014 | Bietsch et al. | |
| 2014/0366128 | A1 | 12/2014 | Venkateswaran | |
| 2014/0366159 | A1* | 12/2014 | Cohen | G06F 21/31 726/28 |
| 2015/0026797 | A1 | 1/2015 | Cao | |
| 2015/0067823 | A1 | 3/2015 | Chatterton | |
| 2015/0071508 | A1* | 3/2015 | Boshra | G06K 9/00013 382/124 |
| 2015/0177842 | A1* | 6/2015 | Rudenko | G06F 3/017 345/156 |
| 2015/0186628 | A1* | 7/2015 | Bush | G06F 21/31 726/19 |
| 2015/0186711 | A1* | 7/2015 | Baldwin | G06F 21/32 382/118 |
| 2015/0193611 | A1* | 7/2015 | Zhao | G06F 21/32 726/19 |
| 2015/0205622 | A1* | 7/2015 | DiVincent | G06F 21/32 713/100 |
| 2015/0205623 | A1* | 7/2015 | DiVincent | G06F 21/32 713/100 |
| 2015/0213245 | A1* | 7/2015 | Tartz | G06F 21/32 726/17 |
| 2015/0220931 | A1* | 8/2015 | Alsina | G06Q 20/12 705/44 |
| 2015/0221151 | A1* | 8/2015 | Bacco | G07C 9/00158 340/5.83 |
| 2015/0264567 | A1* | 9/2015 | Sensharma | H04W 12/06 455/411 |
| 2015/0332032 | A1 | 11/2015 | Alameh et al. | |
| 2015/0347732 | A1 | 12/2015 | Alameh et al. | |
| 2016/0026884 | A1* | 1/2016 | Ferren | G02B 13/0065 382/118 |
| 2016/0034901 | A1* | 2/2016 | Ferren | G02B 13/0065 705/44 |
| 2016/0071111 | A1 | 3/2016 | Wang et al. | |
| 2016/0203306 | A1 | 7/2016 | Boshra | |
| 2016/0226865 | A1 | 8/2016 | Chen et al. | |
| 2017/0032114 | A1 | 2/2017 | Turgeman | |
| 2017/0063852 | A1* | 3/2017 | Azar | G06F 21/32 |

(56) References Cited

U.S. PATENT DOCUMENTS

| | | | |
|---|---|---|---|
| 2017/0076077 A1* | 3/2017 | Zhao | G06F 21/32 |
| 2017/0109950 A1* | 4/2017 | Bacco | G07C 9/00087 |
| 2017/0169204 A1* | 6/2017 | Fadell | G06F 21/32 |
| 2017/0199997 A1* | 7/2017 | Fadell | G06F 21/32 |

FOREIGN PATENT DOCUMENTS

| | | |
|---|---|---|
| EP | 1990769 A1 | 11/2008 |
| EP | 2709031 A1 | 3/2014 |
| GB | 2474536 A | 4/2011 |

OTHER PUBLICATIONS

Chetty et al.; Multimedia Sensor Fusion for Retrieving Identity in Biometric Access Control System; ACM Transactions on Multimedia Computing, Communications and Application; vol. 3, No. 4; Article 26; pp. 1-21; Nov. 2010.

U.S. Patent and Trademark Office; Final Office Action; U.S. Appl. No. 14/276,107; dated Dec. 1, 2016.

U.S. Patent and Trademark Office; Non-Final Office Action; U.S. Appl. No. 14/276,107; dated Jul. 18, 2016.

U.S. Patent and Trademark Office; Final Office Action; U.S. Appl. No. 14/276,107; dated Feb. 1, 2016.

U.S. Patent and Trademark Office; Non-Final Office Action; U.S. Appl. No. 14/276,107; dated Jul. 31, 2015.

European Patent Office; EP Office Action; EP Application No. 15726444.1; dated Dec. 20, 2016.

U.S. Patent and Trademark Office; U.S. Appl. No. 14/289,978; Non-Final Office Action; dated Sep. 4, 2015.

U.S. Patent and Trademark Office; U.S. Appl. No. 14/289,978; Final Office Action; dated Mar. 15, 2016.

U.S. Patent and Trademark Office; U.S. Appl. No. 14/289,978; Non-Final Office Action; dated Mar. 23, 2017.

U.S. Patent and Trademark Office; U.S. Appl. No. 14/289,978; Final Office Action; dated Jul. 20, 2017.

International Search Report and Written Opinion; International Application No. PCT/US2015/032632; dated Sep. 14, 2015.

U.S. Patent and Trademark Office; U.S. Appl. No. 14/289,978; Non-Final Office Action; dated Mar. 13, 2018.

U.S. Patent and Trademark Office; U.S. Appl. No. 14/289,978; Final Office Action; dated Aug. 27, 2018.

* cited by examiner

ELECTRONIC DEVICE WITH METHOD FOR CONTROLLING ACCESS TO SAME

CROSS-REFERENCE TO RELATED APPLICATIONS

This application is a continuation of U.S. patent application Ser. No. 14/276,107, filed May 13, 2014, having inventors Rachid M. Alameh et al., entitled "Electronic Device with Method for Controlling Access to Same", commonly assigned to the assignee of the present application, which is hereby incorporated by reference.

TECHNICAL FIELD

The present disclosure is related generally to user authentication techniques on electronic devices.

BACKGROUND

Although the potential advantages of using biometric authentication over traditional personal identification number ("PIN") authentication have long been understood, its use in consumer electronic devices has only recently become popular. With biometric authentication, a user does not need to enter a PIN and, under the right conditions, does not even need to touch the device in order to unlock it.

Most existing biometric authentication schemes use the same basic access logic that traditional PIN-based systems use. That is, a user is either authenticated or is not. The user either gains full access or no access. Furthermore, they generally do not adjust in real-time for dynamic conditions such as the movement and position of the user.

DRAWINGS

While the appended claims set forth the features of the present techniques with particularity, these techniques, together with their objects and advantages, may be best understood from the following detailed description taken in conjunction with the accompanying drawings of which:

DESCRIPTION

According to various embodiments of the disclosure, an electronic device (also referred to as "the device") is able to alter one or more settings of its imager (e.g., its camera) based on the motion of a user that the device is attempting to authenticate. In an embodiment, the device captures a first set of image data of the user (e.g., a moving video or still image of the user), alters a setting of the imager based on the motion, captures a second set of image data of the user, and authenticates the user based on the second set of image data.

According to an embodiment of the disclosure, the device grants the user a first level of access to the device based on the first set of image data and grants the user second level of access to the device based on the second set of image data. The number of possible access levels is not limited, and the example of two levels discussed herein is only meant to be illustrative. Additionally, the electronic device may capture the two sets of image data with two different imagers, stitch the sets of image data together, and carry out authentication on the stitched sets of image data. The number of imagers that may be used is not limited to two, however.

Figure 1A:
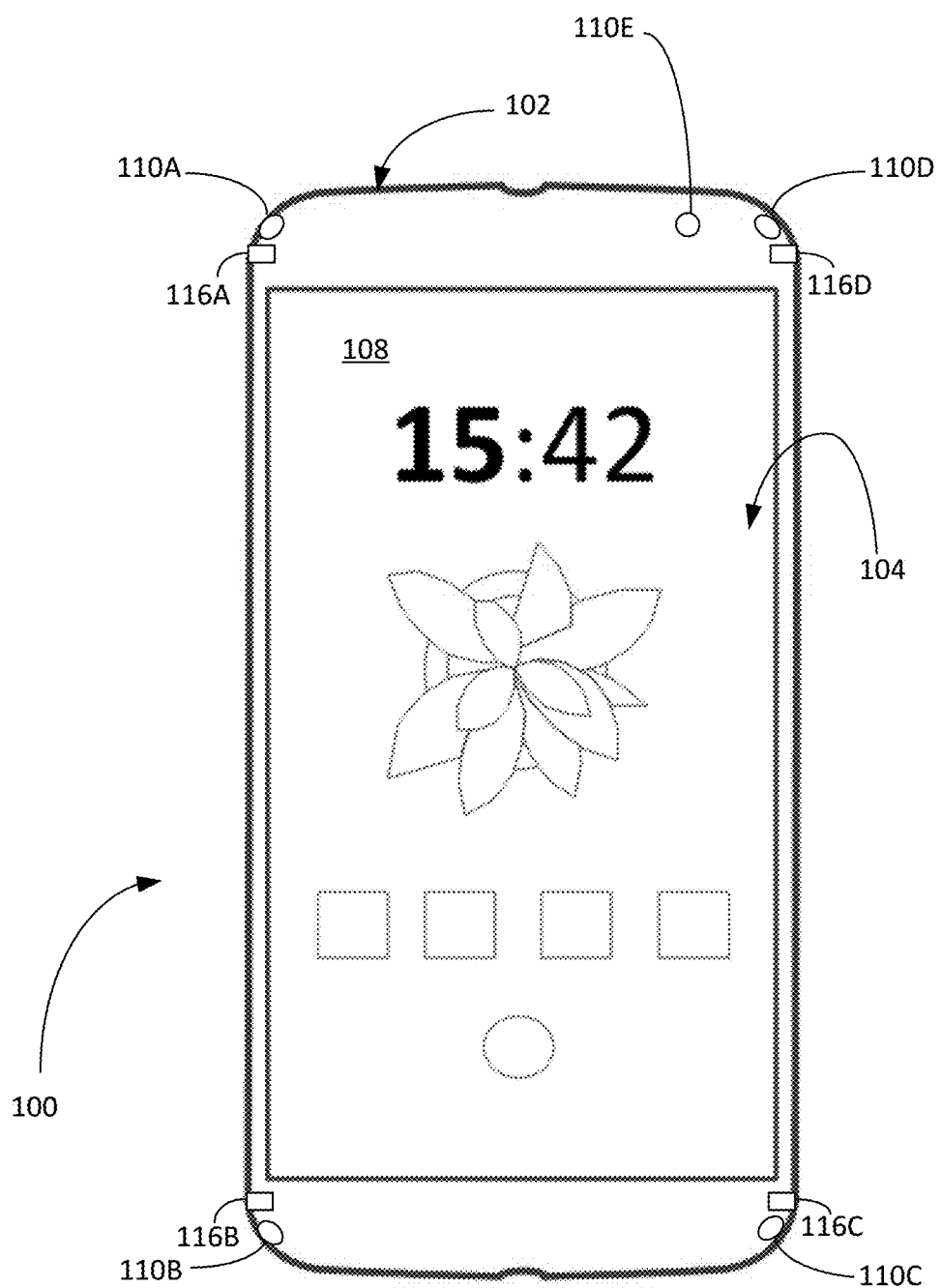
FIG. 1A is a front view of an electronic device according to an embodiment.
Figure 1B:
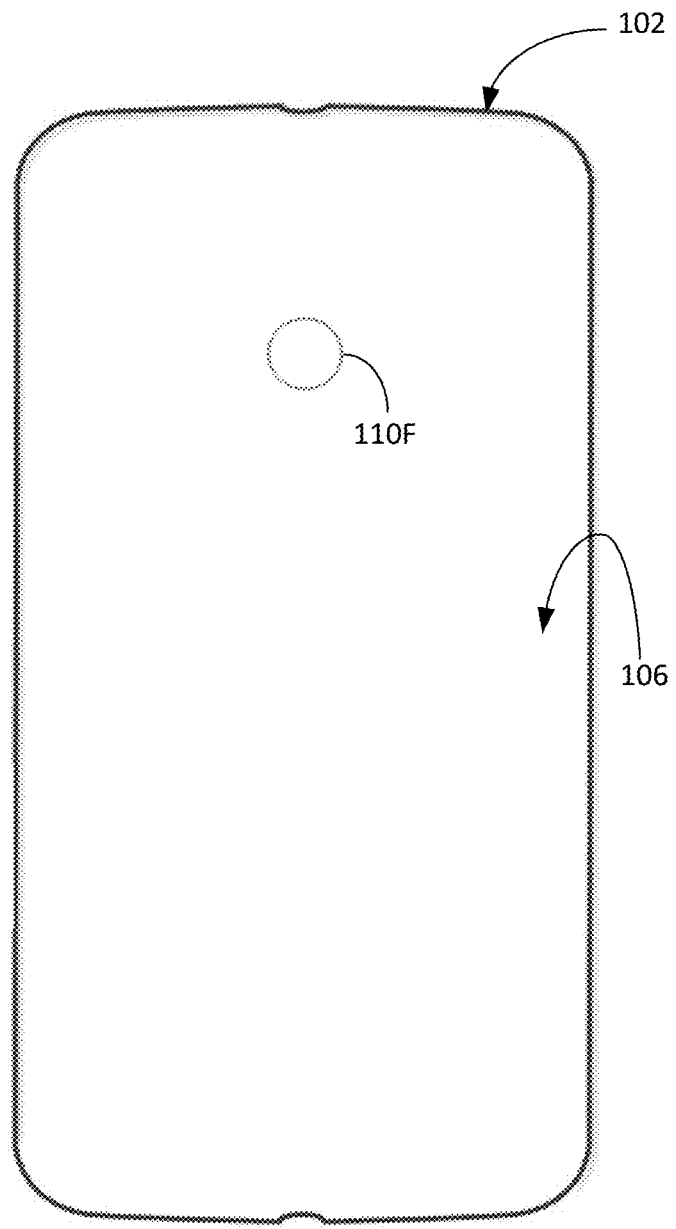
FIG. 1B is a rear view of an electronic device according to an embodiment.

Turning to FIG. 1A and FIG. 1B, an embodiment of the electronic device ("the device"), generally labeled 100, includes a housing 102 having a front side 104 and a rear side 106. Set along the perimeter of the housing are a first imager 110A, a second imager 110B, a third imager 110C, and a fourth imager 110D. Each of the first through fourth imagers has a field of view that extends outwardly from the perimeter of the device 100. Also set along the perimeter of the device 100 are a first motion sensor 116A, a second motion sensor 116B, a third motion sensor 116C, and a fourth motion sensor 116D. Each motion sensor is configured to sense motion external to device 100. Each motion sensor may be implemented as a passive infrared detector, such as a digital thermopile sensor, or as an active sensor that uses reflected light of a light source of the device 100.

Set within the front side 104 of the housing 102 is a display 108 (e.g., an organic light-emitting diode display) and a fifth imager 110E (e.g., a front facing camera). Set within the rear side 106 of the housing 102 is a sixth imager 110F (e.g., a rear facing camera). Although depicted in FIGS. 1A and 1B as a smartphone, the electronic device 100 may be implemented as other types of devices, including a tablet computer, portable gaming device, and a wearable device (e.g., a smart watch).

Figure 2:
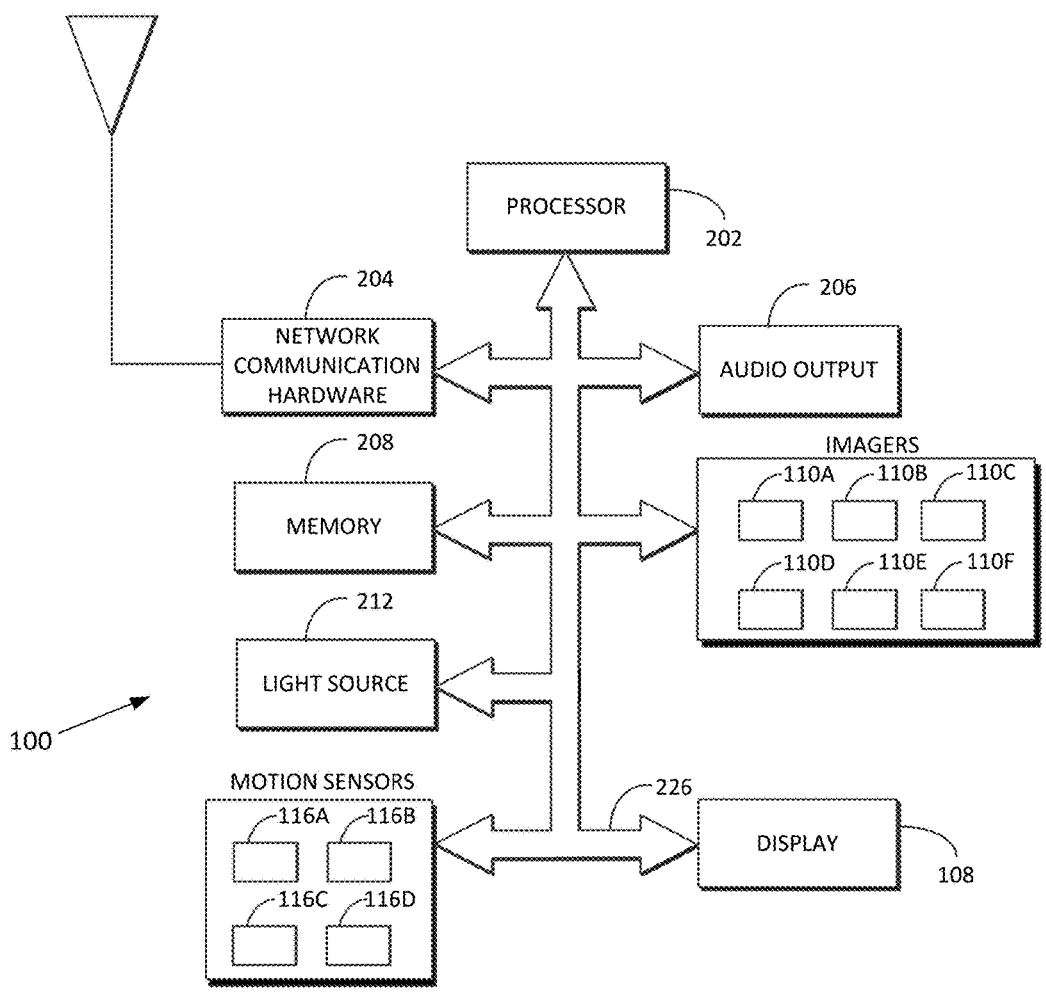
FIG. 2 is a block diagram of the electronic device according to an embodiment.

Turning to FIG. 2, an embodiment of the electronic device 100 includes a processor 202, network communication hardware 204 (e.g., WiFi chip or a cellular baseband chipset), an audio output 206 (e.g., a speaker), a memory 208 (which can be implemented as volatile memory or non-volatile memory), and a light source 212 (e.g., an infrared light-emitting diode). In various embodiments, the processor 202 retrieves instructions and data from the memory 208 and, using the instructions and data, carries out the methods described herein. Each of the elements of FIG. 2 (including the elements of FIGS. 1A and 1B that appear in FIG. 2) is communicatively linked to one or more other elements via one or more data pathways 226. Possible implementations of the data pathways 226 include wires, conductive pathways on a microchip, and wireless connections. Possible implementations of the processor 202 include a microprocessor and a controller.

Figure 3:
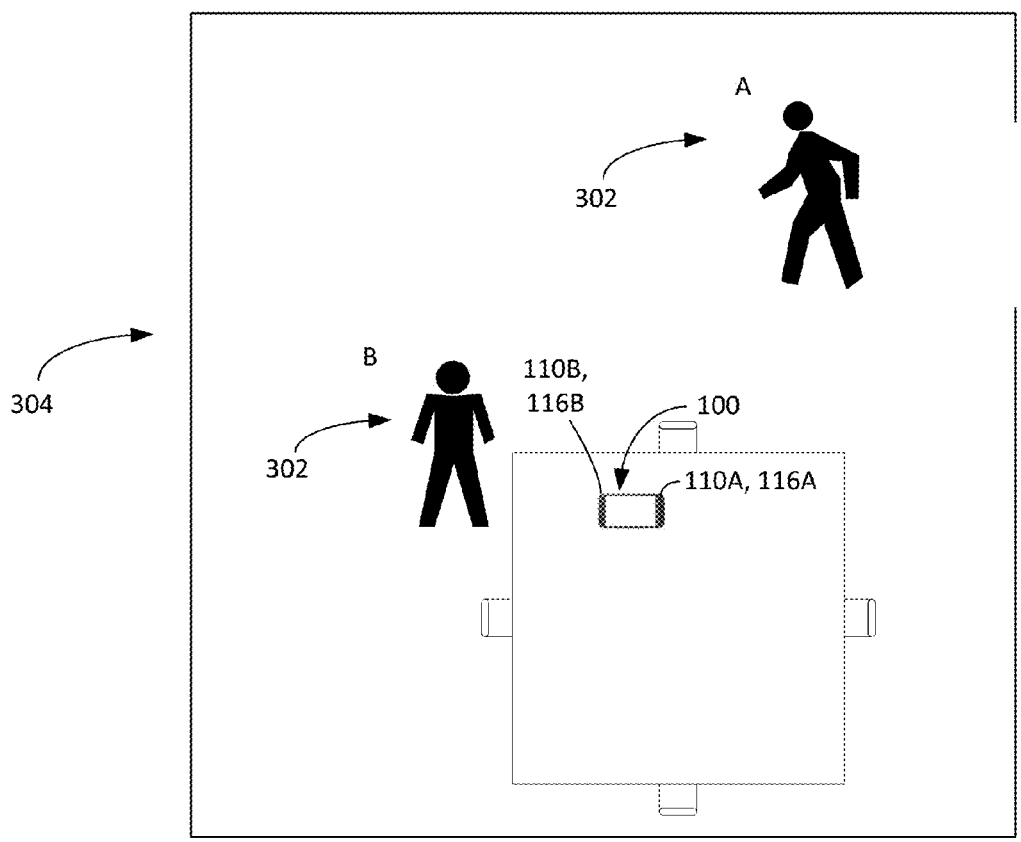
FIG. 3 is a diagrammatic view of a scenario in which the electronic device may be used.
Figure 4:
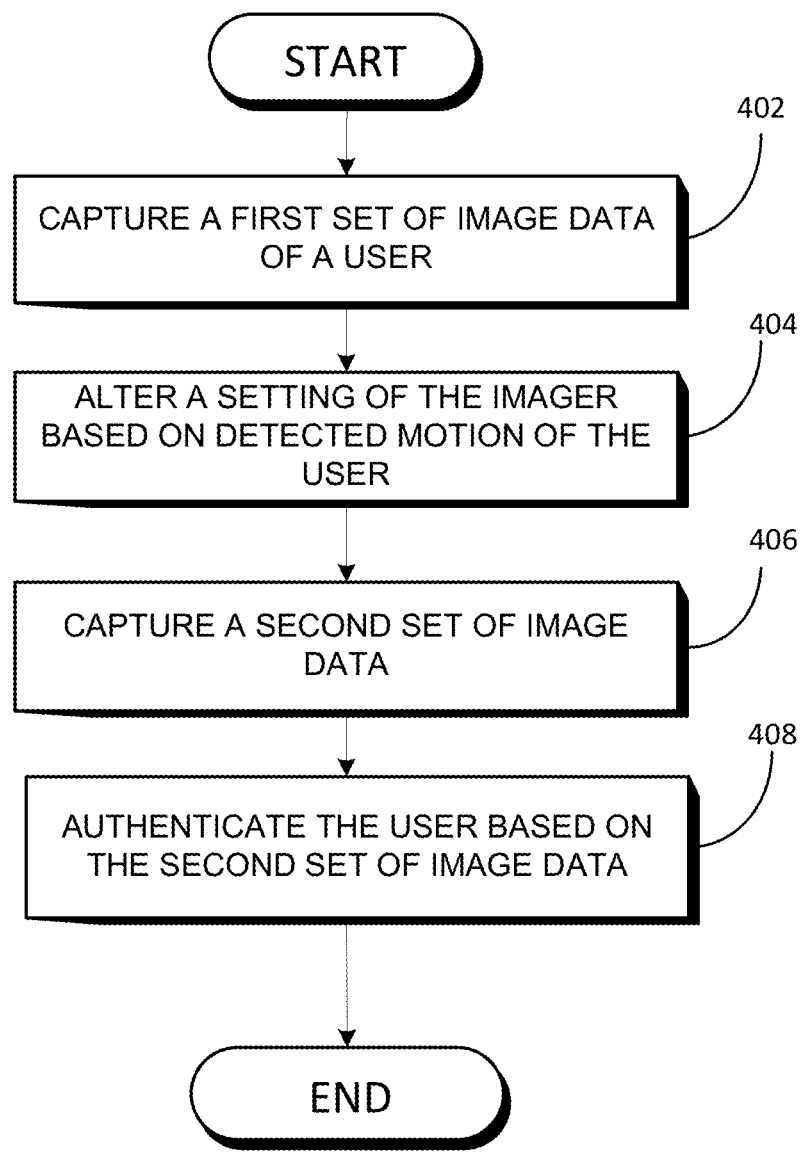
FIG. 4 is a process flow diagram of a method that may be carried out in an embodiment.

Turning to FIG. 3 and to the flowchart of FIG. 4, a procedure that the device 100 carries out to authenticate a user in an embodiment will now be described. As shown in FIG. 3, the electronic device 100 is lying on a table in a room 304. A user 302 of the device enters the room 104 at position A and is moving. When the user is at position A, the first motion sensor 116A detects the user 302 and provides data regarding the user to the processor 202 (FIG. 2), including data regarding the user's position, motion (including the user's gait), speed, and context. In response to receiving the data, the processor 202 turns on the first imager 110A and controls the first imager 110A to capture a first set of image data (i.e., a still image, multiple still images, or multiple images organized as a moving image) of the user 302 (block 402) and provides the first set of image data to the processor 202. The processor 202 attempts to authenticate the user 302 using the first set of image data. For example, the processor 202 may attempt to authenticate the user 302 based on biometric data, such as the user's body geometry (e.g., the user's body shape, gender, height, girth, and gait). Thus, if the processor 202 knows that an authorized user is a tall male, and the image data indicates that the user 302 is a tall male, then the processor 202 will determine that it is possible that the user 302 is the authorized user. Conversely, if the image data indicates that the user 302 is a short female, then the authentication will fail.

In this scenario, the processor 202 determines, with at least a 50% confidence level (based on its authentication attempt with the first set of image data) that the user 302 is an authorized user. Based on this determination, the processor 202 grants the user 302 a first level of access to the device 100. The first level of access may involve granting the user 302 access to telephone functions or lower security applications of the device 100. For example, the processor 202 may control the audio output 206 to inform that user 302 that "You missed two phone calls and have one voicemail." The processor 202 may also control the display 108 to display the user's access level (e.g., "You are now able to access the phone functions").

The processor 202 continues to receive data (position, motion, speed, and context) from the first motion sensor 116A. The processor 202 analyzes the data from the first motion sensor 116A. At block 404, the processor 202 alters a setting of the first imager 116A based on the detected motion. For example, the processor 202 may determine, based on the detected motion, that the user 302 is moving at or above a certain speed threshold (e.g., 3 feet per second), and, based on this fact, may increase the frame rate of the first imager 110A (e.g., from 20 frames per second ("fps") to 50 fps). This increase in frame rate allows the first imager 110A to obtain more detail about the user in order to compensate for the fact that the user 302 is now in motion or is now moving faster. Other ways that the processor 202 can alter a setting of the first imager 110A include controlling the first imager 110A to change one or more of its shutter speed, shutter timing, illumination setting, resolution, aperture, and zoom setting. In various embodiments, any or all of these changes may be triggered by the same motion sensor that prompted the processor 202 to turn on the first imager 202.

After the processor 202 alters the setting, the processor 202 controls the first imager 110A to capture a second set of image data of the user 302 (block 406) and provide the second set of image data to the processor 202. For example, the processor 202 may receive a second moving video of the user from the first imager 110A, this time at the higher frame rate.

In this example, it is assumed that the processor 202 is able to use the second set of image data (e.g., the second, higher-frame-rate moving video) to authenticate the user 302 (block 408). For example, the processor 202 may authenticate the user 302 with a high enough confidence level to grant the user 302 a second level of access. The processor 214 grants the user 302 the second level of access to the device 100 based on the second set of image data. Granting the second level of access may involve the processor 202 granting the user 302 access to one or more of pictures, files, emails, or higher security applications on the device 100. The processor 202 may also control the display 108 to display the user's access level (e.g., "You are now able to access email").

Figure 5:
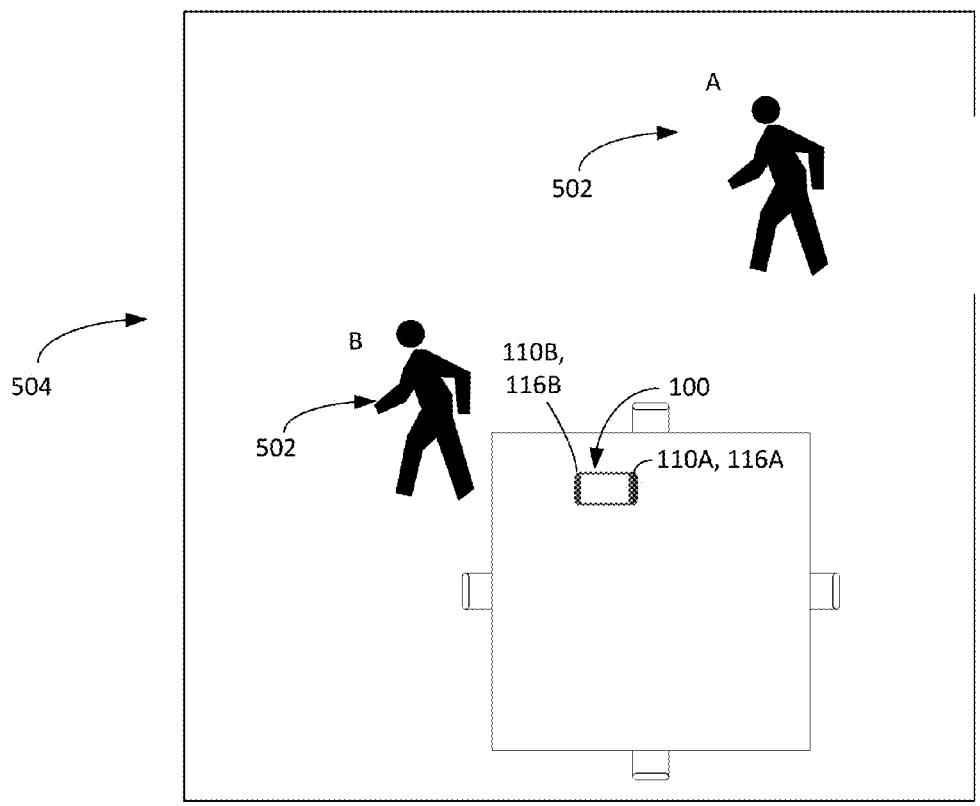
FIG. 5 is a diagrammatic view of another scenario in which the electronic device may be used.
Figure 6:
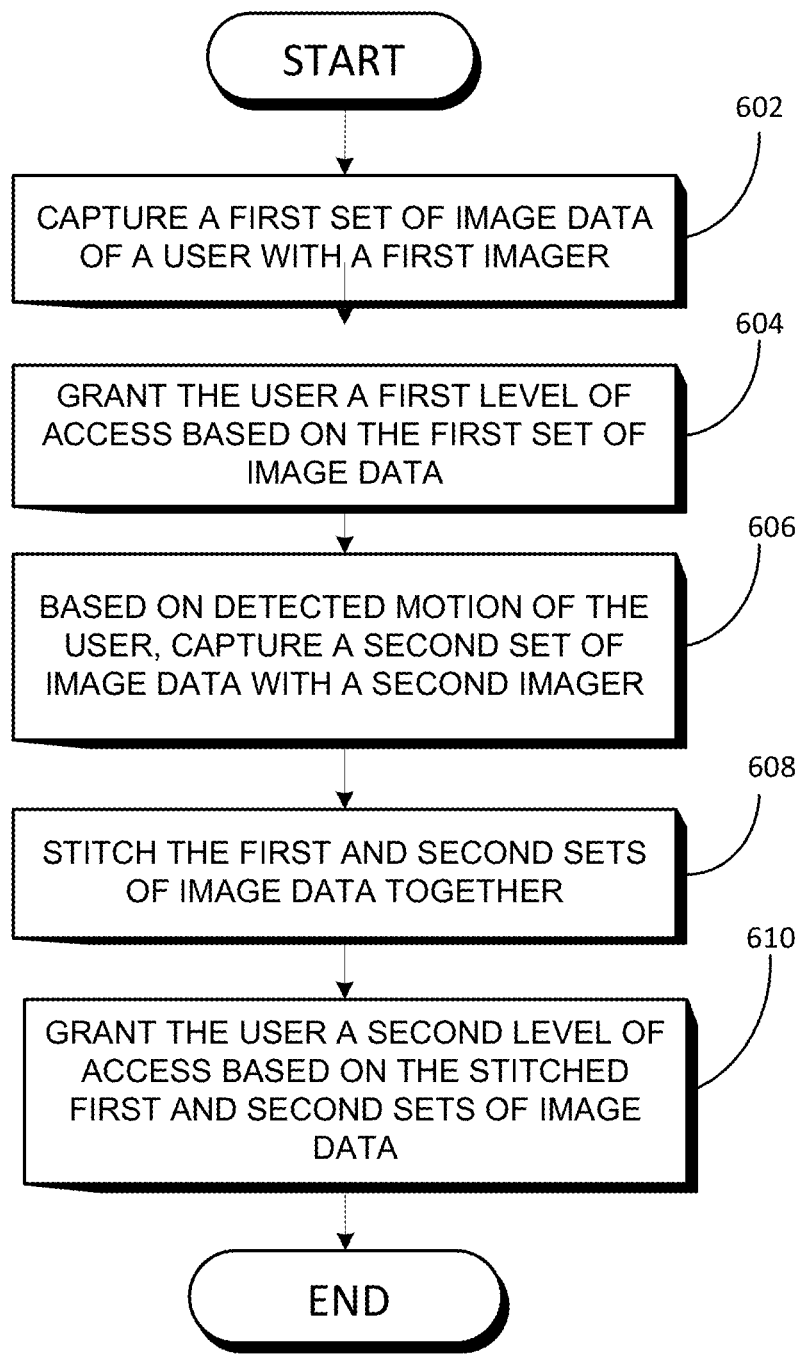
FIG. 6 is a process flow diagram of a method that may be carried out in another embodiment.

In another embodiment, the device 100 uses multiple imagers to gradually authenticate a user. Referring to FIGS. 5 and 6, a procedure for doing so will now be described.

As shown in FIG. 5, the electronic device 100 is lying on a table in a room 504. A user 502 of the device enters the room 504 at position A and is moving. When the user is at position A, the first motion sensor 116A detects the user 502 and provides data regarding the user, such as the user's position, motion (including the user's gait), speed, and context, to the processor 202 (FIG. 2). In response to receiving the data, the processor 202 turns on the first imager 110A and controls the first imager 110A to capture a first set of image data of the user 302 (block 602) and provides the first set of image data to the processor 202. The processor 202 attempts to authenticate the user 502 using the first set of image data. In this scenario, the processor 202 determines, with at least a 50% confidence level based on its authentication attempt with the image data that the user 502 is an authorized user. Based on this determination, the processor 202 grants the user 502 a first level of access to the device 100 (block 604).

The processor 202 then receives data regarding the user, including the user's position, motion (including the user's gait), speed, and context, from the second motion sensor 116B. The processor 202 analyzes the data from the second motion sensor 116B and, based on this motion data (and possibly based on further data from the first motion sensor 116A) determines that the user 502 has moved within viewing range of the second imager 110B. The processor 202 reacts by turning on the second imager 110B and controlling the second imager 110B to capture a second set of image data of the user 502 (block 606). The controller 202 then stitches the first set of image data and the second set of image data together (block 608). This stitching process allows the processor 202 to get a more comprehensive view of the user 502 and attempt to authenticate the user 502 on that basis. At block 610, the processor 202 grants the user 502 a second level of access to the electronic device 100 based on the stitched first and second sets of image data. In doing so, the processor 202 may also use the stitched images to assess the environment surrounding the device 100—such as the walls, ceiling, room settings, and table—and grant a level access to the user if the processor 202 determines that the environment is specific to the user (the user's house, office, car, etc.) The processor 202 can also use the surrounding environment to reinforce the biometric data (i.e., the user's gait, etc.) collected regarding the user. In this scenario, the combination of the environmental authentication and the biometric authentication is enough for the processor 202 to raise the level of access from a first level to a second level at block 610.

The process described in conjunction with FIG. 6 is not limited to two imagers. For example, if the user 502 continued to walk around the device 100, the third and fourth motion sensors 116C and 116D could detect the motion and signal the processor 202. The processor 202 could react by activating the third imager 110C and the fourth imager 110D, respectively, control the imagers to capture third and fourth sets of video data, and perform stitching (and possibly environmental analysis) in order to grant the second level of access, or even to grant further levels of access.

Furthermore, the process described in conjunction with FIG. 6 may also be carried out with sensors of the device 100, such as the motion sensors 116A-116D. For example, as the user walks around the device 100, the processor 202 may stitch the data from the first motion sensor 116A and the second motion sensor 116B together. The stitched data can be used, for example, to map the XY position of the user, and may be part of the basis upon which the processor 202 grants the first or second level of access.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments of the have been described with reference to the figures, it will be understood by those of ordinary skill in the art that various changes in form and details may be made therein without departing from their spirit and scope of as defined by the following claims. For example, the steps of the flow diagrams of FIGS. 4 and 6 can be reordered in way that will be apparent to those of skill in the art. Steps may also be added to the flow diagrams of FIGS. 4 and 6 without departing from the spirit of the disclosure.

We claim:

1. A method for controlling access to an electronic mobile device, the method carried out by the electronic mobile device comprising:
   activating an imager of the electronic mobile device, based on detected motion of a user, to capture a first set of image data of the user;
   carrying out a first authentication procedure on the user based on the user's body geometry with the first set of image data;
   granting the user a first level of access to the electronic mobile device based on the first set of image data;
   altering a setting of the imager to facilitate user authentication based on further occurrences of the detected motion of the user;
   capturing a second set of image data of the user with the imager after altering the setting of the imager;
   carrying out a second authentication procedure on the user based on the user's body geometry with the second set of image data; and
   granting the user a second level of access to the electronic mobile device based on the second set of image data.

2. The method of claim 1, wherein:
   granting the first level of access comprises granting the user access to telephone functions or lower security applications of the electronic mobile device, and
   granting the second level of access comprises granting the user access to one or more of pictures, files, emails, and higher security applications on the electronic mobile device.

3. The method of claim 1, wherein the user's body geometry is one or more of the user's body shape, body size, and gait.

4. The method of claim 1, wherein the setting is one or more of the imager's frame rate, shutter speed, shutter timing, illumination, resolution, aperture, and zoom.

5. The method of claim 1, further comprising changing an illumination intensity of a light source on the electronic mobile device based on further detected motion of the user.

6. An electronic mobile device comprising:
   an imager; and
   a processor configured to:
      activate the imager, based on detected motion of a user, to capture a first set of image data of the user;
      carry out a first authentication procedure on the user based on the user's body geometry with the first set of image data;
      grant the user a first level of access to the electronic mobile device based on the first set of image data;
      alter a setting of the imager to facilitate user authentication based on further occurrences of the detected motion of the user;
      activate the imager to capture a second set of image data of the user based on the altered setting of the imager;
      carry out a second authentication procedure on the user based on the user's body geometry with the second set of image data; and
      grant the user a second level of access to the electronic mobile device based on the second set of image data.

7. The electronic mobile device of claim 6, wherein:
   the processor is further configured to grant the first level of access by granting the user access to telephone functions or lower security applications of the electronic mobile device, and
   the processor is further configured to grant the second level of access by granting the user access to one or more of pictures, files, emails, and higher security applications on the electronic mobile device.

* * * * *